(12) United States Patent
Chase et al.

(10) Patent No.: US 10,216,769 B1
(45) Date of Patent: Feb. 26, 2019

(54) ASSET CATALOG MANAGEMENT METHODS AND SYSTEMS

(71) Applicant: PMS Systems Corporation, Santa Monica, CA (US)

(72) Inventors: Phillip Thomas Chase, Pacific Palisades, CA (US); Christopher John Campbell, Agoura Hills, CA (US)

(73) Assignee: PMS Systems Corporation, Santa Monica, CA (US)

( * ) Notice: Subject to any disclaimer, the term of this patent is extended or adjusted under 35 U.S.C. 154(b) by 699 days.

(21) Appl. No.: 14/475,858

(22) Filed: Sep. 3, 2014

Related U.S. Application Data

(60) Provisional application No. 61/873,304, filed on Sep. 3, 2013.

(51) Int. Cl.
*G06F 17/30* (2006.01)
*G06Q 10/08* (2012.01)

(52) U.S. Cl.
CPC .. *G06F 17/30289* (2013.01); *G06F 17/30091* (2013.01); *G06F 17/30365* (2013.01); *G06Q 10/087* (2013.01)

(58) Field of Classification Search
CPC ......... G06F 17/30289; G06F 17/30091; G06F 17/30365; G06Q 10/087
See application file for complete search history.

(56) References Cited

U.S. PATENT DOCUMENTS

| | | | | |
|---|---|---|---|---|
| 6,650,346 B1* | 11/2003 | Jaeger | ............... | G06F 17/30722 705/28 |
| 7,552,134 B2* | 6/2009 | Norton | ................. | G06Q 10/087 |
| 8,397,128 B1* | 3/2013 | Alonzo | ................. | G06Q 10/06 714/4.1 |
| 2008/0215366 A1* | 9/2008 | Robson | ................ | G06Q 10/087 705/2 |
| 2014/0244314 A1* | 8/2014 | Donald | ................ | G06Q 10/087 705/4 |

\* cited by examiner

*Primary Examiner* — Huawen A Peng
(74) *Attorney, Agent, or Firm* — Sheppard Mullin Richter & Hampton LLP

(57) ABSTRACT

Asset catalog management methods and systems are provided. An asset catalog management service may provide a customer the structured classification, indexing, search and reporting of the customer's inventory of assets As part of the service, a customer may be provided an asset catalog application and a customer catalog and/or a master asset catalog. An asset catalog provides structured information regarding various asset classes, each class referring to a combination of one more asset class attributes such as a manufacturer, a model number, a descriptor of the asset, performance specifications for the asset, and parameters labeling the performance specifications. The service processes asset records received from the customer for cataloging. The service may process an asset record by automatically matching it to an existing asset catalog data entry. The asset catalog management service may also provide a dual-use cataloging service that combines a master catalog with a customer-specific catalog.

23 Claims, 13 Drawing Sheets

| Model | Model Name |
|---|---|
| 9S6-00001 | TABLET PC |
| 9UR-00001 | SURFACE PRO |
| SURFACE PRO | SURFACE PRO 128 |
| SURFACE PRO 1514 | TABLET |
| SURFACE PRO 2 | SURFACE PRO 2 |
| SURFACE PRO 64 | (none) |
| SURFACE WIN 8 PRO | TABLET PC |

FIG. 1
(Prior Art)

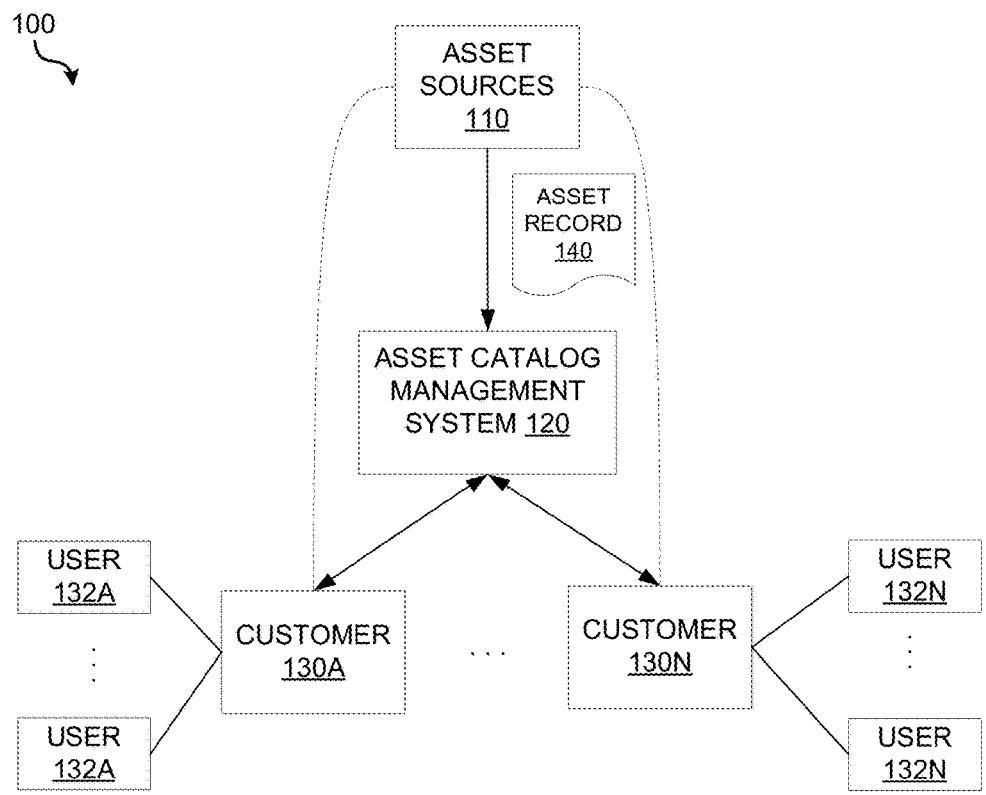
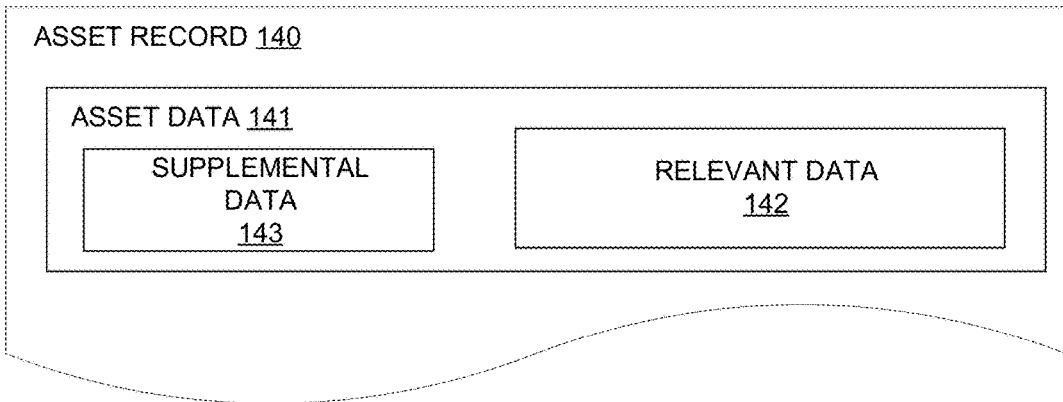
FIG. 2A

| TABLE 301 ||
|---|---|
| FIELD 302 | TYPE 303 |
| ASSET CATALOG REFERENCE NO. 304 | INT |
| MANUFACTURER 306 | VARCHAR |
| MODEL 308 | VARCHAR |
| DESCRIPTOR 310 | VARCHAR |
| PERFORMANCE 312 | VARCHAR |
| FEDLOG data 314 | VARCHAR |
| ADD'L KEYS 316 | . . . |

ASSET CATALOG DATA TABLE
401

| REFERENCE 402 | DES1 404 | DES2 406 | MFG 408 | MODEL 410 | PERF1 412 | PERF2 414 | ... |
|---|---|---|---|---|---|---|---|
| 4155 | POWER SUPPLY | PS, DC | MFG A | RE3721 | 40 | 5 | |
| 4156 | POWER SUPPLY | PS, DC | MFG A | RP6636 | 40 | 5 | |
| 4157 | POWER SUPPLY | PS, DC | MFG A | TE5840 | 40 | 5 | |
| 4158 | POWER SUPPLY | PS, DC | MFG B | UC8612 | 40 | 5 | |
| ... | ... | ... | ... | ... | ... | ... | |

FIG. 5

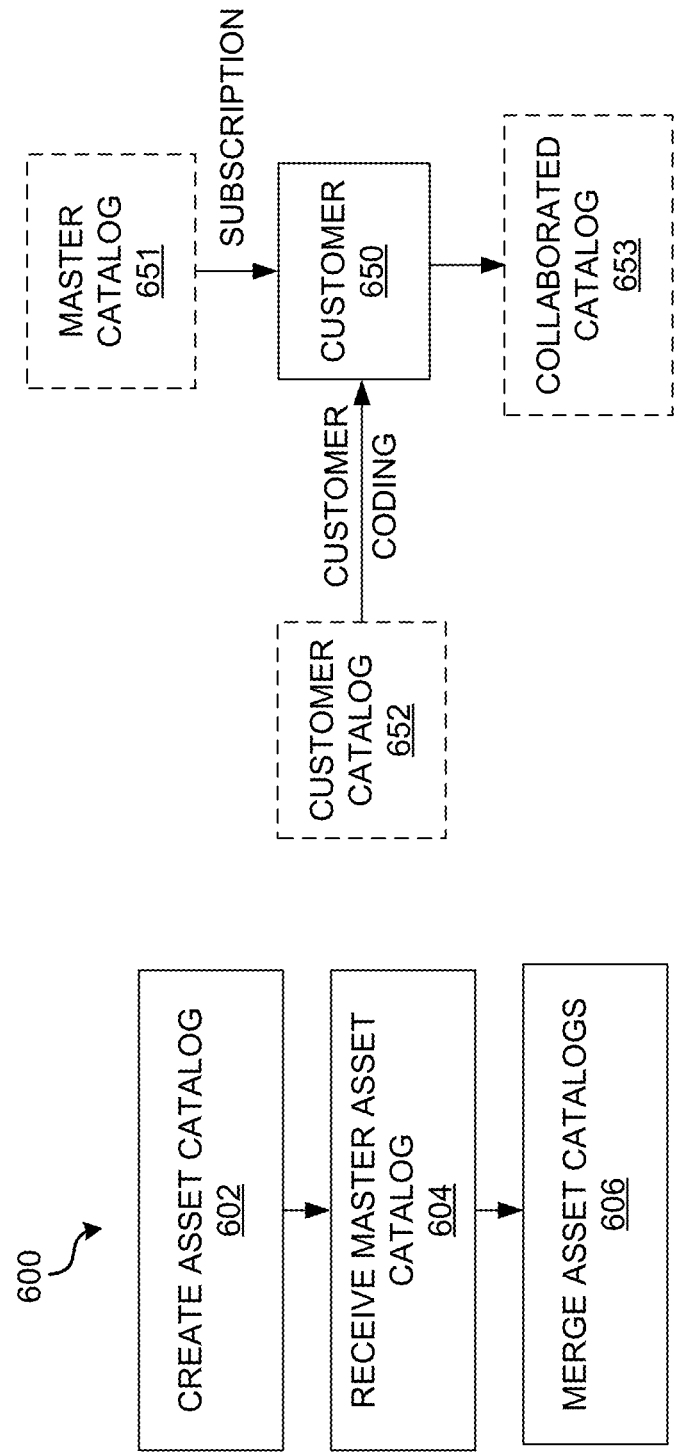

ASSET CATALOG MANAGEMENT METHODS AND SYSTEMS

CROSS-REFERENCE TO RELATED APPLICATIONS

This application claims the benefit of U.S. Patent Application No. 61/873,304 filed on Sep. 3, 2013, which is incorporated herein by reference in its entirety.

TECHNICAL FIELD

The present application relates generally to asset systems, and more particularly, some embodiments relate to asset catalog management methods and systems.

DESCRIPTION OF THE RELATED ART

Asset management is a systematic and cost-effective process of operating, maintaining, upgrading, and disposing assets. Asset-catalog management systems monitor and maintain assets. These systems facilitate entities in managing the entire life cycle (e.g., design, construction, commissioning, operation, maintenance, repair, modification, replacement, decommissioning, and disposal) of an asset. Because asset-cataloging systems generally manage a large variety and quantity of assets from numerous manufacturers and/or vendors, it is imperative that these systems operate accurately and efficiently.

However, conventional asset-catalog management systems are generally cumbersome and prone to errors. In these systems, the data generally is not accurately structured and normalized in the asset catalog database, resulting in incorrect or missing manufacture names, incomplete model numbers, non-standard descriptions, and a lack of specifications. This problem is known in the art as crowd cataloging. FIG. 1 illustrates an example conventional asset-catalog-management-system table that suffers from the problem of crowd cataloging. The customer's cataloged assets (tablet computers) of FIG. 1 include inconsistent and unstructured nomenclature. Later data searches of these crowd cataloged assets are likely to be frustrating, unintuitive, incomplete and unreliable. This problem is exacerbated as the inventory volume of cataloged assets grows.

Although recent conventional cataloging systems have attempted to address the crowd-cataloging problem, they still suffer from several deficiencies. First, these systems offer fixed catalogs that are unadaptable for cataloging a customer's proprietary or otherwise unique assets. Second, these systems inefficiently catalog a customer's existing inventory, particularly during a first pass through of the customer's large inventory.

BRIEF SUMMARY OF SELECTED EMBODIMENTS

Asset catalog management methods and systems are provided. An asset catalog management service may provide a customer the structured classification, indexing, search and reporting of the customer's inventory of assets In one embodiment, a customer may be provided an asset catalog application and a customer catalog and/or a master asset catalog as part of an asset catalog management subscription service.

An asset catalog provides structured information regarding various asset classes, each class referring to a combination of one more asset class attributes. In one embodiment, the asset class attributes may include a manufacturer, a model number, a descriptor of the asset, performance specifications for the asset, and parameters labeling the performance specifications.

In one embodiment, the asset catalog includes one or more asset catalog data tables that are created based on data structures that define one or more fields corresponding to one or more columns of the tables. In this embodiment, the tables may define or structure a plurality of asset classes based on asset class attributes. Each asset catalog data table row may store an asset class and each table column may define an asset class attribute. In particular embodiments, multiple asset catalog data tables may be used to create and store an asset catalog data entry for an asset class. In particular implementations of these embodiments, each asset catalog data table may store an asset class attribute for an asset class, and all the asset catalog data tables may be linked by an asset catalog reference number or other information.

In one embodiment, an asset catalog management system automatically processes asset records received from the customer for cataloging. In this embodiment, an asset catalog management service may receive a subscribing customer's uncataloged asset records from the customer's asset inventory. The service may automatically and dynamically match the customer's asset catalog records with a catalog and store them as one or more asset catalog data entries in the customer's catalog.

In one particular implementation of this embodiment, the service may process an asset record submitted by a customer by using an auto-matching algorithm that matches the record to an existing asset catalog data entry. In this embodiment, the auto-matching algorithm may be used to provide a uniform manufacturer designation for a manufacturer when generating an asset catalog data entry by performing the operations of: identifying a manufacturer name and a model number from the data record; generating a manufacturer code corresponding to the manufacturer name and a model code corresponding to the model number; and determining a manufacturer designation and a model designation by using the manufacturer hash code and the model hash code.

In yet another embodiment, a dual-use asset catalog management service may be provided. In this embodiment, a system for dual-use cataloging of assets may include a master catalog database that is provided to a user subscribed to an asset catalog management service, a customer catalog database that was created based on the user's subscription to the asset catalog management service, and means for merging the master catalog database with the customer catalog database. In this embodiment, the master catalog database may comprise a first data structure for a set of asset classes and the customer catalog database may comprise a second data structure for the set of asset classes.

Other features and aspects of the technology described herein will become apparent from the following detailed description, taken in conjunction with the accompanying drawings, which illustrate, by way of example, the features in accordance with embodiments of the technology. The summary is not intended to limit the scope of the application, which is defined solely by the claims attached hereto.

BRIEF DESCRIPTION OF THE DRAWINGS

The present technology, in accordance with one or more various embodiments, is described in detail with reference to the following figures. The drawings are provided for purposes of illustration only and merely depict typical or example embodiments. These drawings are provided to facilitate the reader's understanding of the technology described herein and shall not be considered limiting of the breadth, scope, or applicability of the application.

FIG. 1 illustrates a conventional asset catalog management system table.

FIG. 2A is a diagram illustrating an environment in which an exemplary asset catalog management system operates in accordance with an embodiment of the systems and methods described herein.

FIG. 4B illustrates an exemplary asset catalog information request form.

FIG. 5 illustrates an example asset catalog data table of an example asset catalog data management system in accordance with an embodiment

FIG. 8A is an operational flow diagram illustrating an exemplary dual-use asset cataloging method in accordance with an embodiment.

FIG. 8B is a block diagram illustrating an exemplary implementation of a dual-use cataloging system in accordance with an embodiment.

The figures are not intended to be exhaustive or to limit the application to the precise form disclosed. It should be understood that the application can be practiced with modification and alteration, and that the application be limited only by the claims and the equivalents thereof.

DETAILED DESCRIPTION OF THE EMBODIMENTS OF THE APPLICATION

Before describing embodiments of the disclosed systems and methods in detail, it is useful to introduce various embodiments in the context of an example environment with which they may be implemented. FIG. 2A is a diagram illustrating an environment 100 in which an exemplary asset catalog management system 120 operates in accordance with one embodiment of the technology disclosed herein. In this example environment 100, the asset catalog management system 120 interfaces with one or more customers 130A-130N having an inventory of assets such as research, testing, and manufacturing equipment, property, facilities, etc. Asset catalog management system 120 may provide an asset catalog dictionary (i.e. "asset catalog" or "asset catalog database") and an asset catalog management application that provide the structured classification, indexing, search and reporting of a customer's inventory of assets.

Figure 2B:
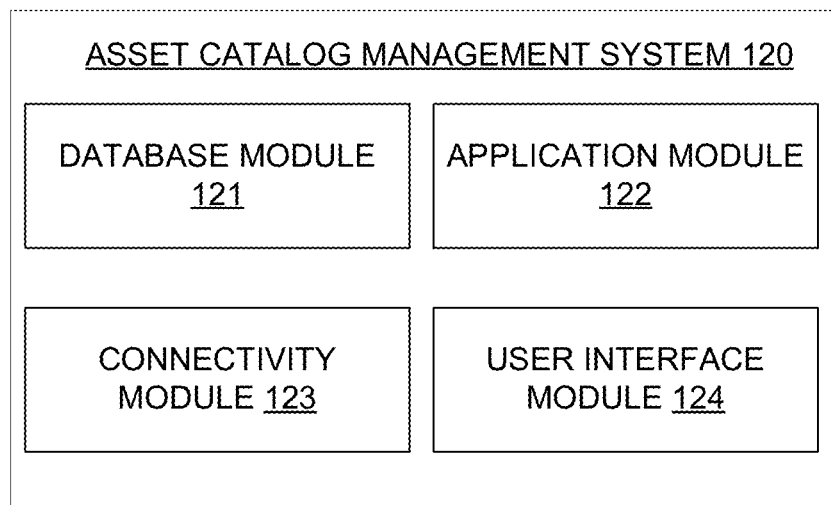
FIG. 2B is a schematic diagram illustrating example modules that the asset catalog management system of FIG. 2A may use to provide the technology disclosed herein.

Example environment 100 will be described with reference to FIG. 2B, which is a schematic diagram illustrating example modules that asset catalog management system 120 may use to implement the technology disclosed herein. The example modules may include a database module 211 defining one or more catalogs, an application module 212 for managing one or more catalogs, a connectivity module 213 for connecting one or more users to system 120, and a user interface module 214 for allowing a user to interact with system 120 to manage a catalog. The illustrated modules may be interoperable and integrated. Additionally some of the functionality of the described modules may be implemented by a user or customer that interfaces with asset catalog management system 120.

As will be further described below, an asset catalog or database may provide structured information, i.e. definitions, regarding various asset classes. As used herein, an asset class refers to a combination of one more asset-identifying attributes ("asset class attributes") that describe a type of asset. Asset class attributes may comprise, for example, a manufacturer, a model number, a descriptor of the asset, performance specifications for the asset, parameters labeling the performance specifications, etc. In some embodiments, an asset class may describe a particular type of asset having a particular model attribute and a particular manufacturer attribute. In other embodiments, an asset class may describe a generic type of asset. Consider a smartphone as an asset class. A particular asset class for a smartphone, for example, could include the manufacturer attribute of "Apple" and the model attribute of "iPhone 5s." A generic asset class for a smartphone, for example, could include the descriptor attribute "smartphone." As another example, a generic asset class for a manufacturing tool could simply include the descriptor attribute "manufacture."

Each asset catalog may comprise one or more asset catalog data tables, each of which hosts one or more asset catalog data entries. In some embodiments, the asset catalog data entries may be provided in a user-defined format. In some embodiments, the asset catalog data tables may be linked together as a relational database. In implementations of these embodiments, an asset class attribute may uniquely correspond to each asset catalog data table.

In various embodiments of environment 100, the asset catalog management system 120 may provide a master asset catalog (e.g., an asset catalog database) to various customers of the customers 130 A-N as a service via database module 121. A customer may comprise a corporation, a hospital, an education institution, etc. In different implementations of these embodiments, the customer may request and manage a copy of a master asset catalog (e.g., a master asset catalog database) or a portion thereof. The obtained asset catalog, for example, the customer asset catalog, may be linked to some or all of the assets in a customer's inventory, thereby providing a structured classification of the customer's inventory of assets.

The customer asset catalog may be hosted by the asset catalog management system 120, the customer, or some combination thereof. Furthermore, the customer asset catalog may be created and updated using an asset catalog management program or application implemented via module 212. In one embodiment, the asset management application links the customer's inventory to the customer asset catalog. In additional embodiments, the asset management application may provide the functionalities of a structured classification, indexing, search, updating, and reporting of the customer's inventory of assets. In some embodiments, a customer asset catalog may be made accessible only to the customer who creates the catalog.

For example, the asset catalog management system 120 may provide asset catalog data entries to a customer of the customers 130 A-N based on the customer's requests. A requesting customer may transmit one or more asset records 140 to the asset catalog management system 120. System 120 then structures and normalizes asset data 141 from each asset record 140 so that corresponding assets may be cataloged as asset catalog entries. The set of normalized and structured asset catalog data entries may be linked to the customer's inventory.

Each asset record 140 submitted in a request by a customer may contain information about one or more of a customer's inventory of assets, which is asset data 141. Consider, for example, a specific computer as an asset. Asset data 141 about the computer in an asset record 140 may include the manufacturer, the manufacture year, model, purchase year, CPU (e.g. speed and manufacturer), hard drive (e.g., capacity and model), price, online catalog etc. The asset data 141 may comprise relevant data 142 and supplemental data 143. Relevant data 142 is required to structure the asset data according to an asset catalog data entry in a catalog using system 120. Supplemental data 143 further describes an asset but is not required to create an asset catalog data entry. In one embodiment, for example, a model number and manufacturer for a particular asset is relevant data. In this embodiment, descriptors and performance specifications for the particular asset may be supplemental data.

Each customer 130A through 130N may comprise one or more users 132A through 132N that can create, modify, update, or search the customer's asset catalog. For example, a user may be an employee of the customer that manually links a new asset in the customer's inventory to the customer's catalog using an asset management application. As another example, the user may search for and identify a specific asset class within the asset catalog that corresponds to one or more assets (if any) in a customer's inventory. Alternatively, the user may be a computer and/or software module configured to automatically manage the customer's catalog.

From time-to-time, various embodiments are described herein in terms of this example environment. Description in terms of this environment is provided to allow the various features and embodiments of the application to be portrayed in the context of an exemplary application. After reading this description, it will become apparent to one of ordinary skill in the art how these and other embodiments can be implemented in different and alternative environments.

Figures 3A, 3B:
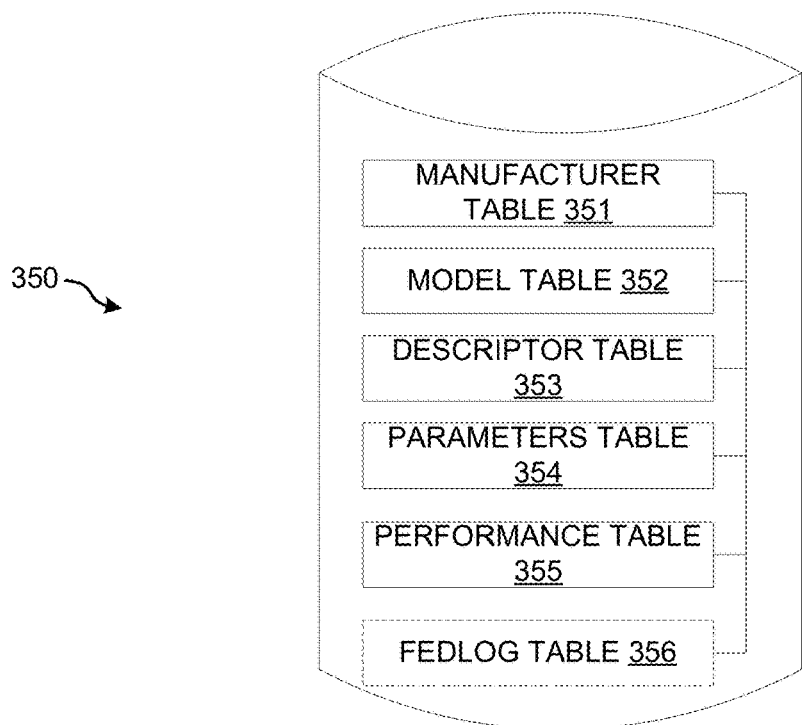
FIG. 3A illustrates example data structures for one or more asset catalog data tables of an asset catalog in accordance with an embodiment of the systems and methods described herein.
FIG. 3B illustrates an exemplary asset catalog comprising separately defined asset catalog data tables.

FIG. 3A illustrates example data structures 300 for one or more asset catalog data tables 301 of an asset catalog in accordance with an embodiment of the systems and methods described herein. The one or more asset catalog data tables 301 may be created based on data structures 300 that define one or more fields or keys 302 of data type 303 corresponding to one or more columns of the tables 301. Illustrative examples of data types include character, variable character, decimal, bit, integer, short integer, long integer, floating point, double precision floating point, long double precision floating point, Boolean, list or array, two-dimensional array, alphanumeric strings, date, date-time, etc.

The defined catalog data tables 301 may be implemented, for example, as a dictionary for a master asset catalog that defines (e.g., structures) a plurality of asset classes based on a plurality of asset class attributes. In this example implementation, each asset class is stored in a row of one or more asset catalog data tables 301 as an asset catalog data entry. Each column of the data table 301 defines an attribute or other information of an asset class. The master asset catalog may subsequently be used to create a customer asset catalog that structures and normalizes a customer's inventory of assets. In further embodiments, the master catalog may be used in various asset management applications.

Example asset catalog data table 301 includes the following column fields 302: asset catalog reference 304, a manufacturer 306, a model 308, a descriptor 310, one or more performance characteristics 312, and supplementary data from FEDLOG 314. The asset catalog reference number field 304 may be unique to each row of the asset catalog data table 301 and identifies an asset class. In the illustrated example, the asset catalog reference field 304 is defined as an integer field. That is, each asset class is assigned an integer ID that uniquely identifies the asset class.

In this example, the fields 306 through 314 are defined as variable character fields. The manufacturer field 306 provides the manufacturer information of an asset class such as, for example, a name, a contact person, an address, an email, a website, a phone number, etc. The model field 308 provides the model information of an asset class such as, for example, a model number (prefix, basic, and suffix), a manufacturer, a series, a national stock number, a upc code, a product code, etc. The descriptor field 310 provides description information of an asset class such as one or more descriptive nouns identifying the asset class. Consider a particular HDMI cable model as an asset class, for example. The descriptive nouns could comprise "HDMI" and "cable."

The performance characteristic field 312 provides performance information of an asset class. One or more performance characteristic fields may be defined in the data structure of an asset catalog data table 301. Consider, for example, a voltmeter as an asset class. Performance information for the voltmeter would comprise, for example, the numerical voltage range and the numerical voltmeter sensitivity. As such, an asset catalog data entry may comprise one or more asset class performance characteristics under various conditions. In some embodiments, the performance characteristic field 312 may be associated with a separate parameter field (not shown) that acts as metadata for a performance characteristic. For example, in the voltmeter example the parameter characteristic for the numerical voltage range may be "DC Voltage."

FEDLOG data field 314 may also be included in table 301 for customers such as government contractors or agencies. The FEDLOG field 314 may provide information of an asset class associated with the United States Federal Government "FEDLOG" system. For example, FEDLOG information may include elements such as the Commercial and Government Entity (CAGE) code of the manufacturer and the National/NATO Stock Number (NSN) of the asset class.

In further embodiments, the data structure for the asset catalog data table 301 may include additional fields 314. An additional field may be defined to provide more fields describing an asset class or for other purposes, such as to indicate the origin of an asset or an asset class record, to provide external links with respect to the manufacturer or model or specifications, to provide manufacturer's data sheet for the model, to provide equipment categories (e.g., as electronic test and measurement equipment, IT/computing equipment, medical instrument), or to indicate the creation time. In addition, options that may significantly alter a model's capability and/or cost, or affect calibration or maintenance procedures, may be included as an additional field. Model life-cycle information may also be included as an additional field, which may be used to track market introduction and discontinuance dates, current availability of parts or services, an estimated catalog list price, or the current open-market resale value. Exemplary additional keys may include, for example, "Information Source," "External Links," or "Manufacturer Data Sheets." It will become apparent to one of ordinary skill in the art after reading this description that other fields and various data types may be used to define the data structure for the asset catalog data table 301.

Figure 3C:
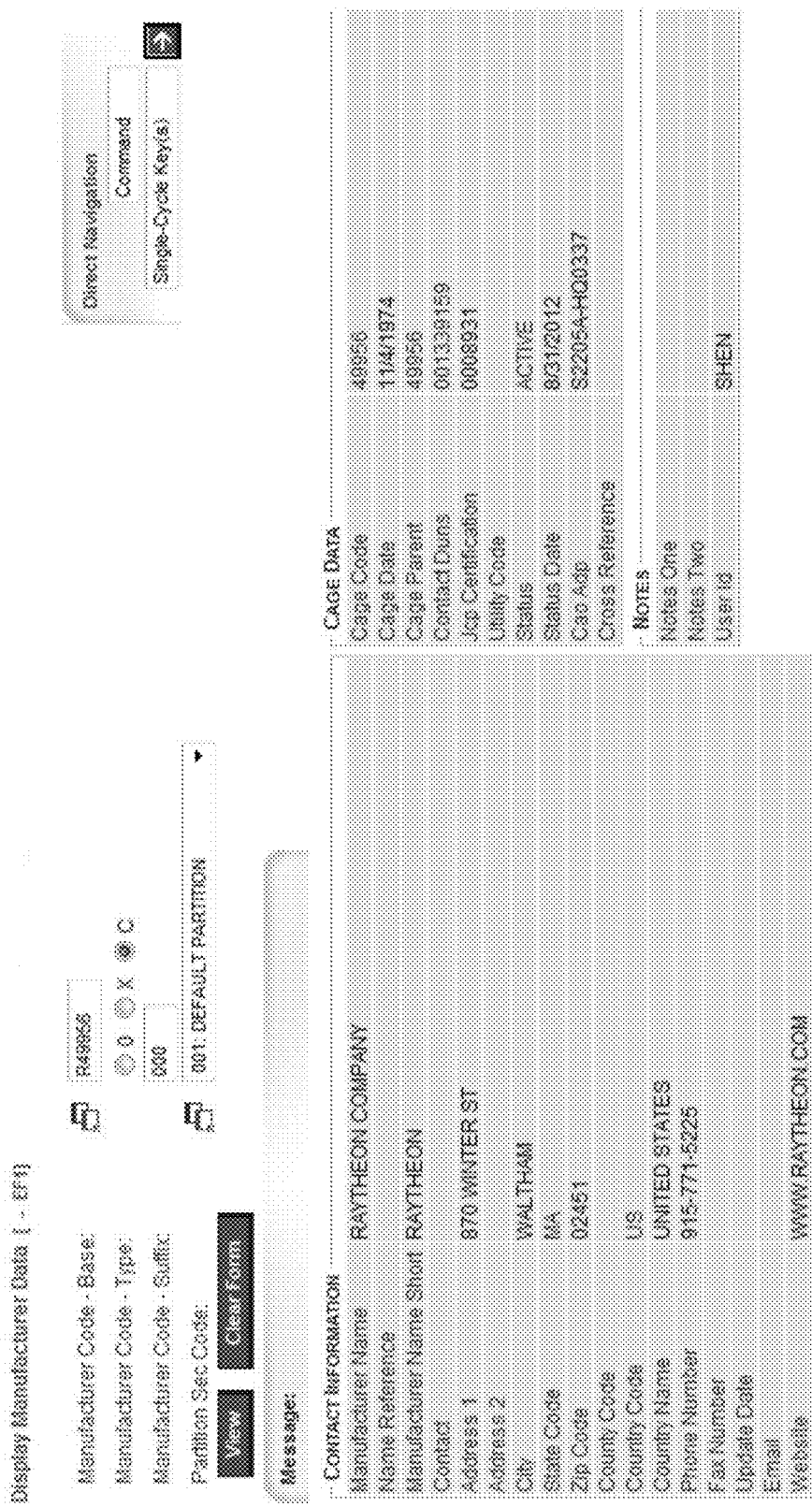
FIG. 3C illustrates an example user interface displaying an asset class attribute with an associated code and associated subfields.

In some embodiments, all or some of the fields 302 correspond to an asset class attribute and have an associated field code. For example, each field 302 may be associated with a library or table that includes additional subfields. FIG. 3C illustrates an example user interface implementation of this embodiment for the manufacturer field. For a given manufacturer, a unique code such as "R49956" may be used to identify the manufacturer. When the code R49956 is subsequently searched, information about the manufacturer (e.g. name, address, phone number, email, etc.) may be viewable as subfields.

In various embodiments, multiple asset catalog data tables may be used to create and store an asset catalog data entry for an asset class. Each asset catalog data table may store one or more asset class attributes for an asset class, and all the asset catalog data tables may be linked by an asset catalog reference number or other information. Data structures for each asset catalog data table may be separately defined. FIG. 3B illustrates one implementation of this embodiment for an asset catalog 350. In this embodiment, five asset catalog data tables 351-355 are used to create an asset catalog data entry for an asset class. The five asset catalog tables 351-355 may be configured to store the asset class attributes including the manufacturer, the model, the descriptor, the performance parameter including units of measure, and the performance specification for an asset class, respectively. A FEDLOG asset catalog table may also be included to store asset class attributes pertaining to US federal government data. In catalog 350, an asset catalog data entry for an asset class may comprise five asset catalog data sub-entries linked by the asset catalog reference number. Each of the five asset catalog data sub-entries is stored along with the asset catalog reference as a data table entry in an asset catalog.

Accordingly, catalog 350 logically links the different attributes of an asset class while maintaining them in separate data tables. This provides several benefits over conventional systems. First, this dictionary linkage assures that a particular inventory asset of a customer is associated with the correct asset class because the manufacturer, model and descriptor attributes for a particular asset class are locked together. Second, this relational linkage allows a user to search a catalog quickly using only a single asset class attribute as a starting point. Consider, for example, a specific computer as an asset class. By searching the descriptor attribute for "comp," a user may quickly locate a specific model (asset class) of computer, review its technical specifications, and get a detailed asset inventory listing including current status and whereabouts for all individual assets of that asset class.

Additionally, unlike conventional systems, the disclosed catalog 350 may be configured to provide the benefit of linking performance specification data with each asset class. Because the asset class attributes in this embodiment are separate catalog data sub-entries, this enables side-by-side comparison of operational characteristics of similar asset classes. An equipment user, for example, can quickly search for and identify performance equivalents and substitutes in response to a request for a specific asset. Consider for example, a request for a voltmeter. A search for voltmeter using the descriptor field may turn up multimeter models having a selectable voltmeter function.

Figure 4A:
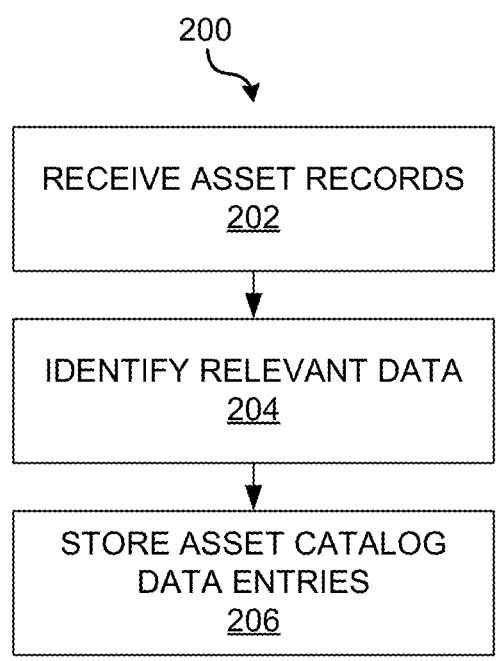
FIG. 4A is an operational flow diagram illustrating an exemplary method of cataloging a customer's assets in accordance with an embodiment of the systems and methods described herein.

FIG. 4A is an operational flow diagram illustrating an exemplary method 200 of cataloging a customer's assets in accordance with an embodiment of the systems and methods described herein. Method 200 may be implemented, for example, to create a new asset catalog for a customer or update a customer' existing asset catalog. The customer may have one or more subscriptions for one or more users to asset catalog management system 120. For example, as part of a subscription, database module 211 may provide a customer an asset catalog. Furthermore, as a part of the subscription a customer may submit asset records 140 to asset catalog management system 120 for structuring and normalizing according to the asset class definitions in a master catalog and/or the asset class definitions in the customer's own catalog. In various embodiments, method 200 may be repeated to catalog some or all of a customer's asset inventory.

With reference now to method 200, at operation 202, an asset catalog management system 120 receives one or more asset records 140 associated with a customer's assets. The customer may be, for example, a corporation, a hospital, an education institution, etc. A user associated with the customer may interface with asset catalog management system 120 via an asset catalog management application to make the asset cataloging request for the customer.

The asset record comprises information related to one or more assets of the customer as well as information related to one or more asset classes of the asset. An asset record may be received in various formats. In one embodiment, the asset record may be received in a file (e.g., an excel file) provided by a user via various communication protocols such as TCP/IP protocols, file transfer protocol ("FTP"), SMTP, etc. For example, in one specific embodiment a user may interface with asset catalog management system 120 via a web browser and upload the file using the web browser.

Figure 4B:
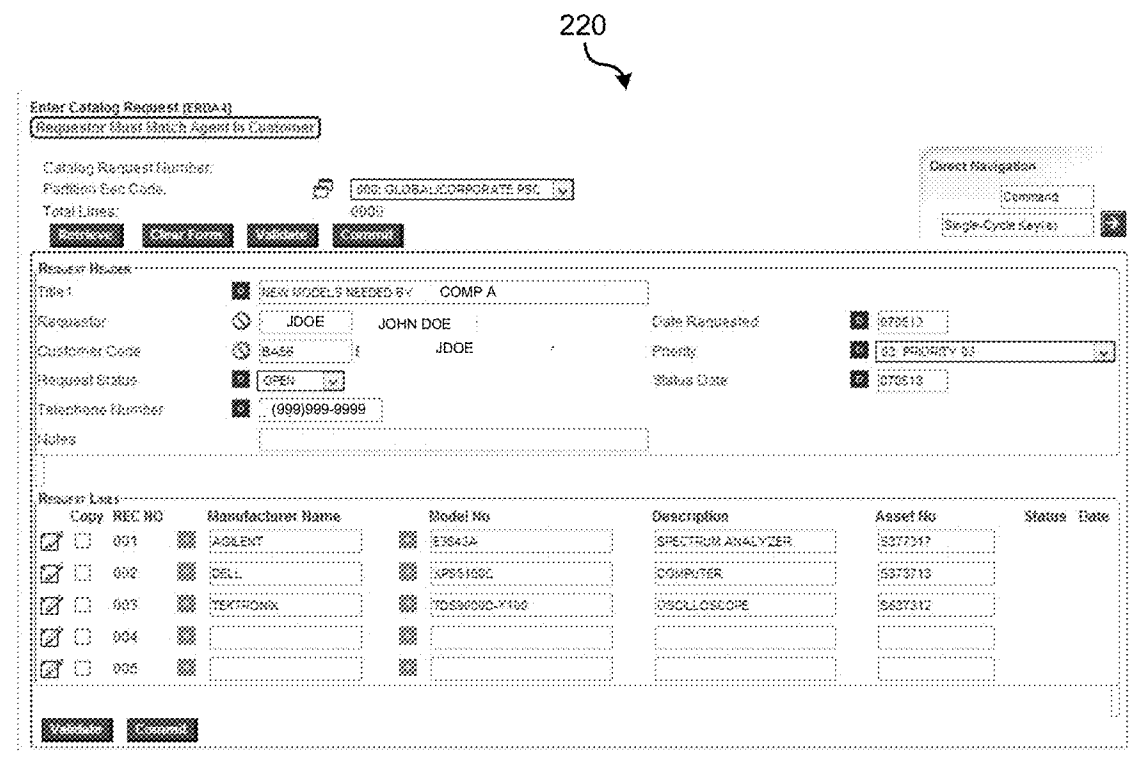

In another embodiment, asset records may be provided as part of a request form completed by a user. FIG. 4B illustrates an exemplary asset catalog information request form 220. As illustrated, form 220 comprises relevant information, including asset class attributes, relating to one or more of the customer's assets. In this example, asset class attributes of manufacturer name, model number, and descriptors are provided. Additionally, asset numbers are provided to identify the individual assets of the customer. If request form 220 provides information for asset classes that are undefined in the customer's existing asset catalog (i.e. none of the provided asset class attributes of manufacturer, model, or description correspond to an asset class), this request may lead to the definition and creation of new asset catalog data entries for the customer's asset catalog. In other embodiments, the information related to an asset class may be received in free-form text records.

An asset catalog can be configured to store a set of asset catalog data entries and each asset catalog data entry can be configured to correspond to an asset class. An asset catalog data entry may comprise a set of asset class attributes for the asset class. Exemplary asset class attributes comprise, for example, the manufacturer designation, the model designation, a description, and performance attribute(s.) For each asset catalog data entry, each asset class attribute may be a separately defined data entity. As such, the asset class attributes are normalized and standardized for each asset class in the asset catalog.

A received asset record 140 may comprise relevant data 142 and supplemental data 143 of an asset class as described above. Relevant data 142 is required to create an asset catalog data entry. Supplemental data 143 is not required to create an asset catalog data entry. In various embodiments, relevant data and supplemental data may be determined by referencing an asset catalog. In particular, the definition of an asset catalog data table where the asset catalog data entry is to be created and stored is referenced. In one embodiment, a server procedure, such as a SQL server procedure, is created and used to receive and process asset records.

At operation 204, relevant data is identified for the asset class to which an asset belongs. The relevant data may be determined according to the asset class attributes defined in an asset catalog. In various embodiments, the relevant data may be identified by pattern-matching algorithms. A received asset record may be compared to an asset catalog data table, in particular, the asset class attributes defined in the asset catalog data table. Information included in an asset record having matches in an asset catalog data table may be identified as relevant data. Referring back to the computer asset example, for an asset catalog data table, the manufacturer, the manufacture year and the model, the CPU, and the hard drive are identified as relevant data for the computer whereas the price information and the online catalog are identified as supplemental data.

Subsequently, at operation 206, the relevant data is stored as an asset catalog data entry for the asset class. In some embodiments, the relevant data may also be used to match with existing asset catalog data entries. In various embodiments, an asset catalog data entry comprises an asset catalog reference and the set of asset class attributes. The asset catalog reference uniquely identifies the asset class. The set of asset class attributes may be defined to provide information (e.g., descriptions, parameters, performance, etc) of an asset class to facilitate asset cataloging and management. In one embodiment, in an asset catalog, an asset class as well as the relevant data can be stored as an asset catalog data entry in an asset catalog data table.

In further embodiments, supplemental data identified at operation 204 may be provided to a user, and an asset catalog may be modified to accommodate the supplemental data. For example, the definition of an asset catalog data table may be modified to include additional asset class attributes such that the supplemental data or a portion thereof may be included for an asset class.

In various embodiments, asset data entries for various assets may be created based on an asset catalog. An asset data entry may be created based on the asset catalog data entry corresponding to the asset class for the asset. An asset data entry may include an asset catalog reference identifier identifying the asset catalog data entry. As such, a linkage between an asset class and an asset, that is, a linkage between an asset catalog data entry and an asset data entry is established.

FIG. 5 illustrates an example asset catalog data table 401 of an example asset catalog data management system in accordance with one embodiment of the systems and methods described herein. The asset catalog data table 401 may be configured to store asset catalog data entries for different asset classes. In the illustrated example, each row of the asset catalog data table 401 is an asset catalog data entry corresponding to an asset class, which is identified by the unique asset catalog reference. Each asset catalog data entry stores a set of attributes associated with the asset class. In the illustrated example, for each asset class, the associated attributes are the descriptors 404 and 406, the manufacturer 408, the model 410, and the performance characteristics 412 and 414.

The descriptors 404 and 406 can be configured to provide generic information describing an asset class. In the illustrated example, the asset classes 4155-4158 are described as "power supply" in the descriptor 404 column, and as "power supply, DC" in the descriptor 406 column. These descriptions are generic or genus level descriptions of asset classes. The descriptor 406 in the illustrated example is more comprehensive than the descriptor 404. In various embodiments, the descriptors may be nouns. Descriptions included in asset records provided by users may be disregarded, and generic and specific descriptors may be determined for each asset from a library or table of descriptors. In some embodiments, the generic and specific descriptors may be determined according to the model number identified for the asset. A library of model numbers and the associated descriptors for each model number may be provided to make such a determination.

In some embodiments, the generic descriptors may be determined from the library of descriptors by analyzing the asset record received. For example, a received data record that comprises information such as output power, output voltage, output current, and manufacturers for power supplies may be determined as a power supply. In other embodiments, a user may determine and define the descriptors for an asset. As such, by assigning consistent descriptors to assets of the same asset class that may be designated differently because of various manufacturers, a consistent recognition of the asset class is assured. In further embodiments, multiple generic descriptors may be provided to an asset class having various functions. For example, the descriptors "power supply, DC" and "power supply, AC" may be used together to describe a power supply that is capable of supplying both DC and AC power. In various embodiments, descriptions included in the asset record received from a user are ignored. In some embodiments, descriptions included in the asset record may be provided to a user when an asset model corresponds to conflicting descriptors.

The manufacturers and the models for each asset class may be stored in columns manufacturer 408 and model 410, respectively. The manufacturer may be identified from an asset record and associated with the asset catalog reference in an asset catalog data entry. In various embodiments, a library of manufacturers is provided from which a standard manufacturer designation for a manufacturer may be determined. As such, asset catalog data entries corresponding to assets by the same manufacturers may have consistent manufacturer attributes. In some embodiments, a manufacturer name may be maintained and regularly updated in a library. For example, a manufacturer's name may be changed in the event of a company change such as, for example, a merger, an acquisition, or a dissolution. In some embodiments, asset catalog data entries corresponding to asset classes produced by the previous manufacturer are updated by using the latest manufacturer name. In further embodiments, cross-references may be provided by linking an asset catalog data entry corresponding to an updated manufacturer name to another asset catalog data entry corresponding to a previous or alternative manufacturer name. As such, an asset catalog data entry may be linked with asset catalog data entries corresponding to the all previous or alternative manufacturer names.

Moreover, the model of an asset may be identified from an asset record and stored in association with the asset catalog reference in an asset catalog data entry. In some embodiments, the model may comprise a model family suffix. A model family suffix uniquely identifies a model family. Asset models belonging to the same model family may be a series of products produced by the same manufacturer, for example, model numbers "123A," "123B," and "123C" may belong to the same family because they share enough similarities including the manufacturer, descriptors and some or all performance attributes. Model attributes such as performance attributes may be stored in association with the asset catalog reference in an asset catalog data entry. In the illustrated example, the output voltage and the output current for each DC power supply is stored under columns performances 412 and 414, respectively. It will become apparent to one of ordinary skill in the art after reading this description that various pertinent performance data may be stored for different asset classes in an asset catalog data table.

In various embodiments, the library of manufacturers, the library of models, and the library of descriptors may be logically interconnected. In one embodiment, the logical interconnection is established by relational databases. Accidental or incorrect assignment or recognition of descriptors, manufacturer, and/or model may be prevented. For example, in the illustrated example, the library of manufacturer and the library of descriptors are logically interconnected such that "Power Supply, DC" is not associated with the manufacturer C. For the asset catalog data table 401 illustrated, it is impossible that the manufacturer C may be stored in the manufacturer 408 column for the asset classes "4155-4158."

In various embodiments, pattern-matching algorithms may be employed to identify relevant data for creating and storing an asset catalog data entry for an asset class. For example, according to the asset catalog data table 401, a manufacturer, a model, an descriptor and other necessary asset class attributes may be identified and extracted from an asset data record. The extracted data is relevant data for creating and storing an asset catalog data entry for an asset class in the asset catalog data table 401. Other data included in the asset record but not extracted is supplemental data for creating and storing an asset catalog data entry for an asset class in the asset catalog data table 401. Nevertheless, in various embodiments, the supplemental data may be provided to a user. An asset catalog data entry as well as the asset catalog data table where the asset catalog data entry is stored may be updated by modifying the data structure of the asset catalog data table. Additional asset catalog attributes may be created for an asset catalog data entry. As such, the supplemental data identified according to the asset catalog data table 401 prior to the modification may be incorporated to provide additional information describing the asset class. In various embodiments, an asset catalog data entry may comprise an attribute describing the origin of the asset record or asset information or the creator of the asset catalog data entry. Only the origin of the asset record or asset information or the creator of the asset catalog data entry may modify or delete the asset catalog data entry.

In various embodiments, multiple asset catalog data tables may be used to create and store an asset catalog data entry for an asset class. Each asset catalog data table may store one or more asset class attributes for an asset class, and all the asset catalog data tables are linked by the asset catalog reference. Data structures for each asset catalog data table may be separately defined.

Figure 6:
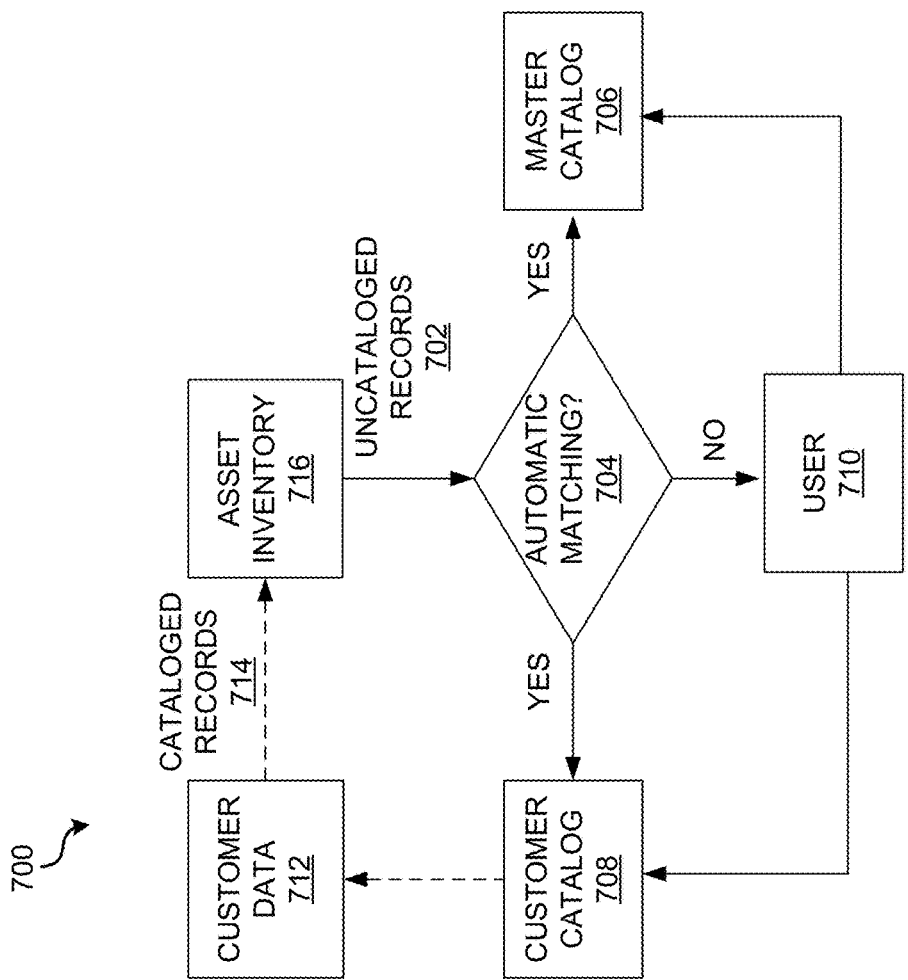
FIG. 6 is a flow diagram illustrating an exemplary asset catalog management subscription service provided by an asset management system in accordance with one embodiment of the technology described herein.

FIG. 6 is a flow diagram illustrating an exemplary asset catalog management subscription service 700 provided by an asset management system in accordance with one embodiment of the technology described herein. For a customer that subscribes to asset management service 700, the uncataloged asset records 702 of the customer's asset inventory 716 may be provided to service 700 for automatic and dynamic matching with a catalog and storage as an asset catalog data entry in the customer's catalog 708. In this embodiment, the customer catalog 708 may be compared to the customer data 712 to determine cataloged asset records 714, which may be compared to the asset inventory 716 to determine the uncataloged asset records 702. The customer may submit uncataloged asset records 702 to the asset catalog management service via web pages, web services, email, FTP, physical storage media, or other communication mediums.

At block 704, the asset catalog management service 700 processes the uncataloged records 702 using an auto-matching algorithm that references a catalog. For example, a master catalog 706 of service 700 or the existing customer catalog 708 may be referenced by the auto-matching algorithm at block 704. If the asset records are successfully matched with the compared catalog, the data of the records may be standardized and structured according to the matched catalog and stored as an asset catalog data entry in customer catalog 708 and/or master catalog 706. Asset records having matching instances may also be linked to existing asset catalog data entries in a master catalog 706 and/or a customer catalog 708. In some embodiments, the uncataloged records may be auto-matched in real-time, thereby providing the benefit of a dynamic system that catalogs asset records as soon as they are submitted.

Asset records having no matching asset catalog instances may be provided to a user 710 for further action. For example, in one embodiment, user 710 may be an analyst of asset catalog management service that reviews the submitted asset records for incomplete model numbers, misspelled manufacturer names, etc. In this embodiment, if the analyst determines the source of the error, the analyst may correct the error and manually enter the asset record as an asset catalog entry for storage in customer catalog 708 and/or master catalog 706.

In various other embodiments, a user 710 may manually enter an asset catalog data for other reasons (e.g. new asset class, automatic matching algorithm did not recognize asset class, etc.). In these other embodiments, user 710 may reference a library of manufacturer names and manufacturer designations to determine the manufacturer designation for creating the asset catalog data entry. The user may further reference a library of model numbers to determine the model number for creating the asset catalog data entry. The library of model numbers may be provided such that only the model numbers that are recognized to be associated with a particular manufacturer designation and/or descriptor are provided. Other asset attributes for creating an asset catalog data entry may be determined manually in a similar fashion.

Figure 7A:
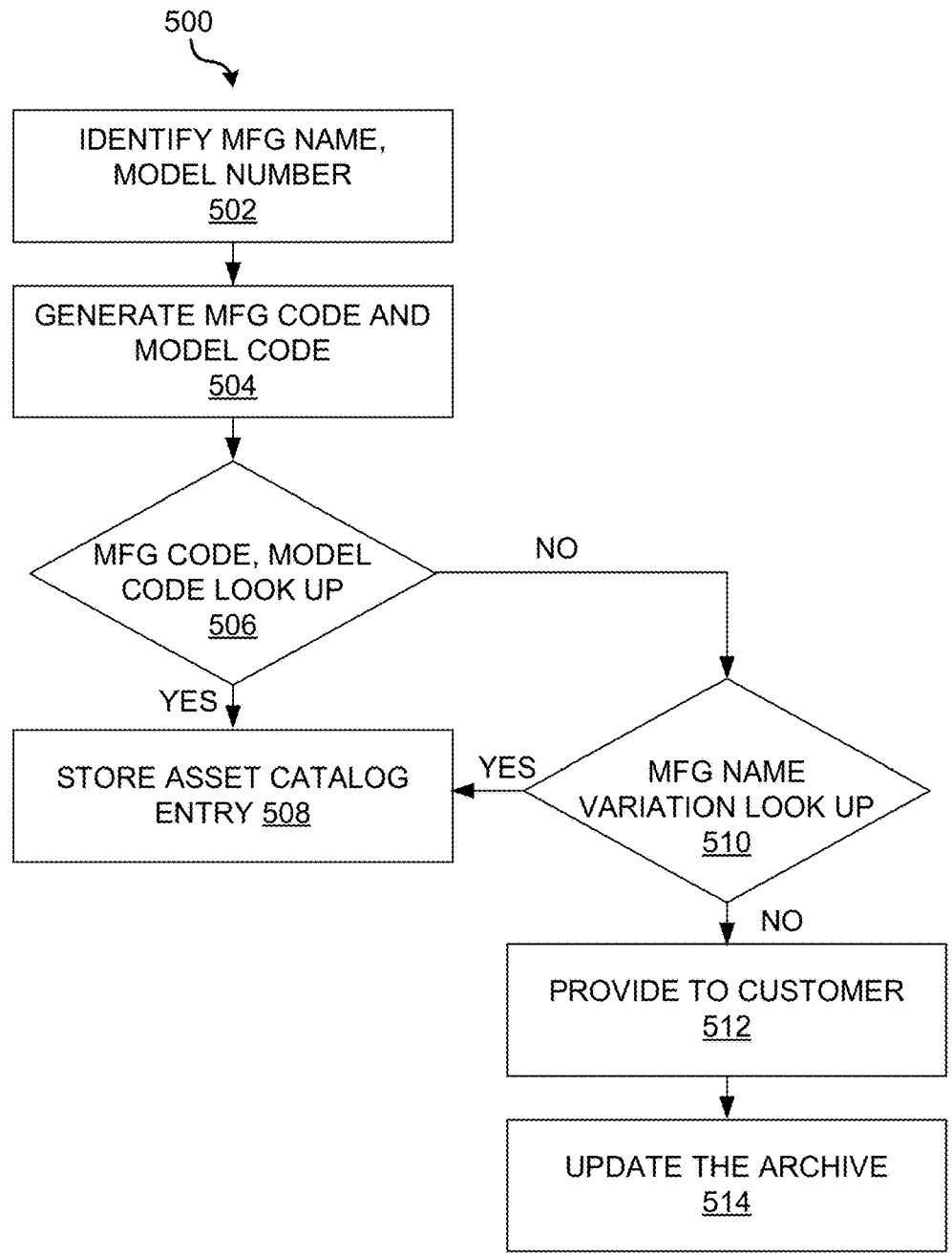
FIG. 7A illustrates an exemplary method of providing a uniform manufacturer designation for a manufacturer when generating an asset catalog data entry.

FIG. 7A illustrates an exemplary method 500 of providing a uniform manufacturer designation for a manufacturer when generating an asset catalog data entry, such as for operations 204 and 206 in FIG. 4A. Exemplary method 500 may be implemented to automatically match an asset record to an existing asset catalog data entry. An asset data entry may be created from a matched asset catalog data entry. When an asset record does not match to any existing asset catalog data entry, an asset catalog data entry may be created for the asset class for the asset. In various embodiments, when the asset records are received such as via a user's submission, the asset records are processed. The manufacturer name and/or the model number of each asset record may be identified and used to create or update the asset catalog data entry for the asset. To provide a uniform and standardized asset catalog across all platforms to various users, a manufacturer is preferably designated with one and only one manufacturer designation. As such, naming variations among users for the same manufacturer may be taken into account.

With reference now to method 500, at operation 502 the manufacturer name and/or the model number is identified for each asset record. The manufacturer name and/or the model number are identified and extracted as they are provided by the user. The manufacturer name and/or the model number may be identified from the asset record using pattern-matching algorithms. In some embodiments, an official manufacturer name (i.e., the registered title of a manufacturer) may be determined from the manufacturer name identified. For example, common abbreviations, acronyms, nicknames, common misspellings, or other alternative naming conventions may be considered to determine an official or otherwise recognized manufacturer name. By way of further example, HP, Hewlett-Packard, Hewlet-Packard, or HewlettPackard, and other common variants could all be equated to "Hewlett-Packard Company." Where appropriate, missing prefixes or suffixes such as "Ltd.," "Corp.," "Inc.," "GmbH," "Corporation," etc. can be added automatically.

Operation 504 entails generating a manufacturer hash code for the manufacturer name and/or a model hash code for the model number identified at operation 502. The manufacturer name may be hashed into a manufacturer hash code corresponding to the manufacturer name or other asset class attributes related to the manufacturer in the asset catalog data table. In one embodiment, the manufacturer name is hashed into a 7- or less character manufacturer hash code. In various embodiments, punctuation (e.g., spaces, hyphens, slashes, or apostrophes), vowels, repeated characters, and/or prefixes and suffixes may be removed from the manufacturer name. In various embodiments, a library of key words may be provided to determine the prefixes and/or suffixes included in a manufacturer name, or to encode or suppress the prefixes and/or suffixes. Each key word of the library of key words may be searched for in a manufacturer name to determine whether the manufacturer name includes such key word. The key word may be removed from the manufacturer name or be encoded specially to generate the manufacturer hash code.

For instance, the word "General" may be a key word because many entities use the word in their names and it is not necessary or sufficient to distinguish one manufacturer entity from another without additional unambiguous words. When generating a manufacturer hash code for the manufacturer name "General Electric," one of the operations may be to remove the word "General" from the manufacturer name. In another embodiment, one of the operations may be to replace the word "General" with a unique token or code such as "^G". The manufacturer hash code is subsequently generated by hashing the remaining characters after removal of or substitution of the characters and/or words. In some embodiments, the model number is hashed into a model hash code corresponding to the model number. In various embodiments, punctuation (e.g., spaces, hyphens, or slashes) may be removed from the model number prior to being hashed. One or more hashing functions may be used to generate the manufacturer hash code and the model hash code.

Figure 7B:
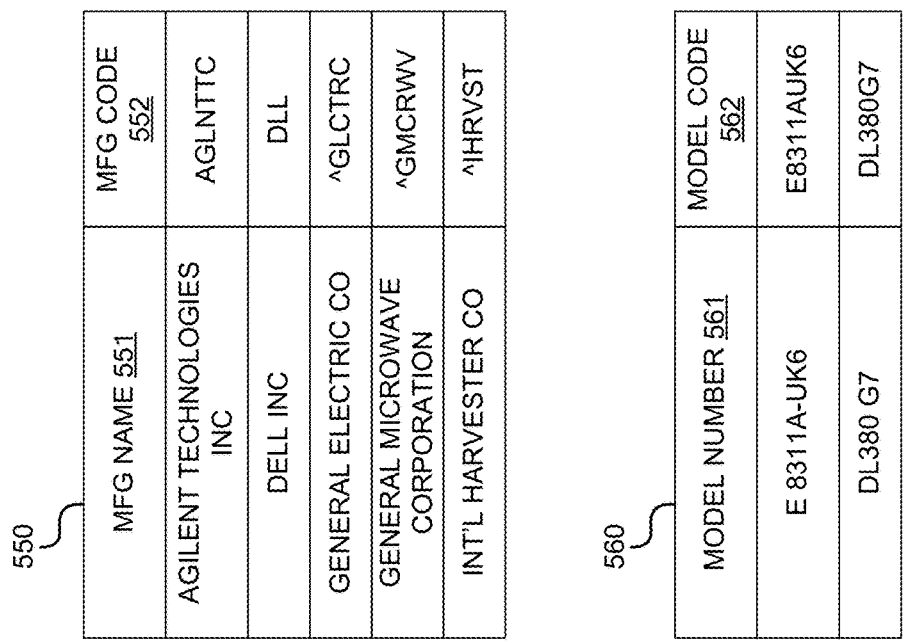
FIG. 7B illustrates exemplary manufacturer codes for manufacturer names and exemplary model codes for model numbers in accordance with an embodiment of the systems and methods described herein.

FIG. 7B illustrates exemplary manufacturer hash codes for manufacturer names and exemplary model hash codes for model numbers. Table 550 illustrates exemplary manufacturer names and corresponding manufacturer hash codes. The manufacturer hash code "AGLNTTC" is derived by hashing the manufacturer name "Agilent Technologies Inc" such that the punctuations and nouns as well as the suffix "Inc" are removed. The manufacturer hash code "^GLCTRC" is derived by hashing the manufacturer name "General Electric Co." such that the punctuations, nouns, and the suffix "Co." are removed, and the prefix "General" is replaced by "^G." The manufacturer hash code "^IHRVST" is derived by hashing the manufacturer name "International Harvester Co." such that the punctuations, nouns, and the suffix "Co." are removed, and the prefix "International" is replaced by "^I." In these examples, the manufacturer hash codes are restricted to seven characters. A manufacturer hash code may be less than seven characters. For example, the manufacturer hash code for the manufacturer name "Dell Inc." is "DLL," which includes three characters.

Table 560 illustrates exemplary model numbers and the respective corresponding model hash codes. A model hash code may be of any length and in some embodiments is derived from a model number by hashing the model number such that the punctuations are removed.

Subsequently, at operation 506, the manufacturer hash code is looked up to determine whether a manufacturer designation corresponding to the manufacturer hash code exists, and/or the model hash code is looked up to determine whether a model designation corresponding to the model hash code exists. An archive may be provided to determine the manufacturer designation from the manufacturer hash code and/or the model number from the model hash code. The archive may provide a set of manufacturer hash code and manufacturer designation associations and/or a set of model hash code and model number associations. In various embodiments, the manufacturer designation, along with other asset attributes, is stored as an asset catalog data entry. The manufacturer designation may be the same as or different from the manufacturer name. For example, "Siemens" is the manufacturer designation for the manufacturer "Siemens AG." The manufacturer designation, upon finding a matching manufacturer hash code, may be used to create an asset catalog data entry, at operation 508.

In further embodiments, at operation 508, upon finding a matching manufacturer hash code, asset data may be matched to an existing asset catalog data entry. In further embodiments, the manufacturer designation and the model designation may be used to determine a set of descriptors for the asset class. A library or table of model designations along with the associated descriptors for each of the model number may be searched for a particular model designation to determine a set of descriptors for the asset class.

In some embodiments, variations of the manufacturer name in addition to the manufacturer hash code may be looked up. For an asset that the manufacturer designation could not be determined from the manufacturer hash code, the manufacturer designation may be determined by using variations of the manufacturer name. At operation 510, variations of the manufacturer name are looked up to determine a manufacturer designation when no matching manufacturer hash code is found. This lookup operation may search variations of the current manufacturer name in addition to any known former names that may have arisen during company name changes, breakups, spin-offs, mergers or acquisitions. Variations of the current or former manufacturer name comprise an abbreviation of the manufacturer name or an acronym of the manufacturer. An archive of variations of a manufacturer name and a manufacturer designation association is provided. For example, "GE," the variation of the manufacturer name "General Electric," may be used in addition to the manufacturer code for "General Electric" to determine the manufacturer designation. The manufacturer designation, determined by using a manufacturer name variation, may be used to match up to an existing asset catalog data entry, at operation 508.

In further embodiments, other asset class attributes of an asset catalog data entry in addition to manufacturer designation and model designation may be determined similarly. Descriptions, parameters, or performance attributes may be identified from asset records by pattern-matching algorithms. A code may be determined for each identified information by using a hashing function. A standard attribute designation is accordingly determined by looking up the code in an archive. The archive provides attribute designation and associated codes.

In further embodiments, a library of manufacturer name cross-references is provided. A manufacturer name may be cross-referenced and the cross-referenced manufacturer name may be looked up. Many events may lead to a change in a manufacturer name or a change of manufacturer name, such as mergers and acquisitions, dissolution, corporate spin-offs, etc. An archive of manufacturer designations associated with an asset class may be provided. That is, the current as well as all the previous manufacturer designation(s) associated with an asset class are provided. In one embodiment, the latest manufacturer designation for an asset class may be determined and used for matching to an existing asset catalog data entry or creating a new asset catalog data entry.

At operation 512, the asset records where the manufacturer name(s) having no corresponding manufacturer designation found may be provided to a user. Manufacturer designations may be created manually for these asset records. For example, a user may reference a library of manufacturer names and corresponding manufacturer designations to determine the manufacturer designation for a manufacturer name manually. In some embodiments, a particular pattern (e.g., spelling or punctuation) of the manufacturer names included in asset records provided by a particular user may be used to train the pattern-matching algorithm(s) used for identifying manufacturer names in operation 502. For example, for assets provided by a particular user, the manufacturer name "Siemense" corresponds to "Siemens." Then, this finding may be used to train the pattern-matching algorithm, such as, "Siemense" is a synonym of "Siemens" for the particular user. Accordingly, the manufacturer name, "Siemense," is identified at operation 502, but only for asset records provided by the particular user. New manufacturer names may be identified. The archive may be updated with the manufacturer designation for the new manufacturer name, at operation 514.

In further embodiments, the asset records that cannot be identified for partial or complete cataloging may be flagged. For example, an asset record may be flagged when a manufacturer name is missing or unrecognizable, the manufacturer provided is a distributor or retailer instead of the original equipment manufacturer ("OEM"), or model number is missing, erroneous, incomplete, or ambiguous, an asset record may be considered to include insufficient or erroneous information. In implementations of this embodiment, the flag may specify the potential source of the error (e.g. ambiguous model number provided). The flagged asset records may be provided to a user (e.g., customer providing the asset records or asset management system owner's employee) for analysis and correction.

In further implementations of this embodiment, asset records that were manually corrected by an employee of the asset management system's owner may be flagged for review by the customer that submitted the asset record data. For example, the asset records may be flagged if the correction was based on a correction where a model number was incorrect but intelligible and unambiguous enough for an asset management system employee to correct. As another example, an asset record may be flagged when an outdated manufacturer name was provided due to a company name change or acquisition, and was manually corrected by an asset management system employee.

FIGS. 8A-8B illustrate an exemplary asset catalog management system and method for providing dual-use cataloging in accordance with one embodiment of the technology described herein. In this exemplary dual-use cataloging system and method, a customer may combine asset catalog management system-provided and managed catalog data with catalog data the customer generates and administers locally. FIG. 8A is an operational flow diagram illustrating an exemplary dual-use asset cataloging method 600 in accordance with an embodiment. FIG. 8B is a block diagram illustrating an exemplary implementation of a dual-use cataloging system. Various embodiments provide asset catalog management service for various users. A customer (e.g., the customer 650) may subscribe to an asset catalog management service. According to the terms of the subscription, all or a portion of the master asset catalog (e.g., the master catalog 651) may be provided to the customer. The master asset catalog is created and maintained by the asset catalog management service, and comprises asset catalog data entries for all the asset records received by the asset management service. In addition, by using the asset catalog management service or a local program or application of the asset catalog management service, a customer may create a customer asset catalog (e.g., the customer catalog 652.)

With reference now to method 600, at operation 602, an asset catalog may be created by a customer. For example, the customer catalog 652 is created by the customer 650. The customer catalog 652 may be created according to the unique customer coding of the customer 650. A customer asset catalog may be different from a master asset catalog because data structures for both asset catalogs may be defined differently. Accordingly, a customer asset catalog and a master catalog may provide different information for the same asset classes. The customer asset catalog may provide proprietary information for an asset class that is not available to users other than the customer associated with the customer asset catalog. For example, proprietary information included in the customer catalog 652 is only available to the customer 650.

At operation 604, a master asset catalog may be received by the customer. The customer may request the master asset catalog based on a subscription to the asset catalog management service. Subsequently, at operation 606, the asset catalog created by the user at operation 602 and the master asset catalog received by the user at operation 604 may be merged. For example, a collaborated catalog 653 may be created. Asset catalog data entries and asset catalog data tables of the master catalog 651 subscription may be merged with asset catalog data entries and asset catalog data tables of the customer catalog 652.

This exemplary dual-use cataloging system and method may be configured to offer an interoperability not found in conventional cataloging systems. In particular, the disclosed dual-use system may allow a customer to both: 1) leverage an existing master catalog of assets to structure the customer's own catalog; and 2) maintain the freedom to catalog and securely administrate the customer's unique and/or otherwise proprietary assets.

Figure 9:
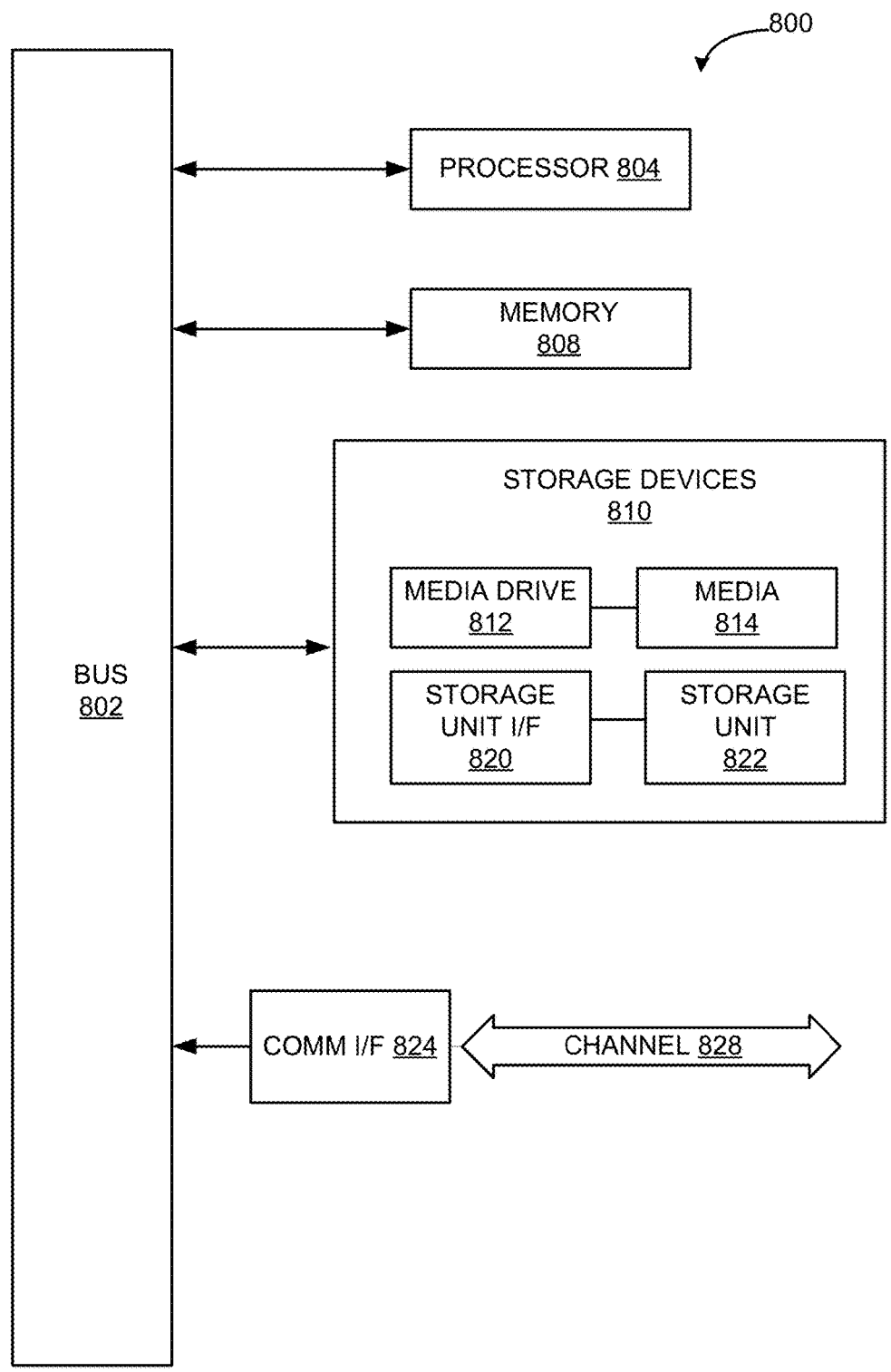
FIG. 9 illustrates an example computing module that may be used in implementing various features of embodiments of the application.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 800. After reading this description, it will become apparent to a person skilled in the relevant art how to implement the application using other computing modules or architectures.

Referring now to FIG. 9, computing module 800 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 800 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 800 might include, for example, one or more processors, controllers, control modules, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing module 800 or to communicate externally.

Computing module 800 might also include one or more memory modules, simply referred to herein as main memory 808. For example, preferably random access memory (RAM) or other dynamic memory, might be used for storing information and instructions to be executed by processor 804. Main memory 808 might also be used for storing temporary variables or other intermediate information during execution of instructions to be executed by processor 804. Computing module 800 might likewise include a read only memory ("ROM") or other static storage device coupled to bus 802 for storing static information and instructions for processor 804.

The computing module 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing module 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing module 800.

Computing module 800 might also include a communications interface 824. Communications interface 824 might be used to allow software and data to be transferred between computing module 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present application as discussed herein.

While various embodiments of the present application have been described above, it should be understood that they have been presented by way of example only, and not of limitation. Likewise, the various diagrams may depict an example architectural or other configuration for the application, which is done to aid in understanding the features and functionality that can be included in the application. The application is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present application. Also, a multitude of different constituent module names other than those depicted herein can be applied to the various partitions. Additionally, with regard to flow diagrams, operational descriptions and method claims, the order in which the operations are presented herein shall not mandate that various embodiments be implemented to perform the recited functionality in the same order unless the context dictates otherwise.

Although the application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of managing asset data records, comprising:
   receiving an asset data record;
   identifying a manufacturer name and a model number from the received asset data record;
   generating a manufacturer hash code corresponding to the manufacturer name and a model hash code corresponding to the model number, wherein the operation of generating the manufacturer hash code comprises:
      identifying all punctuation, vowels, repeated characters, prefixes, and suffixes in the manufacturer name;
      generating a set of characters by removing all the punctuation, vowels, repeated characters, prefixes, and suffixes from the manufacturer name; and
      determining the manufacturer hash code for the manufacturer name by hashing the set of characters;
   determining a manufacturer designation and a model designation by using the generated manufacturer hash code and the model hash code, wherein determining the manufacturer designation comprises looking up the generated manufacturer hash code to determine whether a manufacturer designation corresponding to the generated manufacturer hash code exists; and
   storing the manufacturer designation and the model designation as an asset catalog data entry.

2. The computer-implemented method of claim 1, wherein the operation of identifying prefixes and suffixes comprises providing a set of key words, and searching for each key word of the set of key words in the manufacturer name.

3. The computer-implemented method of claim 1, further comprising:
   providing a library of manufacturer name variations;
   determining a set of manufacturer name variations for the manufacturer name; and
   determining the manufacturer designation by using the set of manufacturer name variations.

4. The computer-implemented method of claim 1, further comprising:

providing a library of manufacturer name cross-references;
determining a set of manufacturer name cross-references for the manufacturer name; and
determining the manufacturer designation by using the set of manufacturer name cross-references.

5. The computer-implemented method of claim 1, further comprising:
providing the asset record to a user upon failing to determine a manufacturer designation or an asset model;
receiving the manufacturer designation for the manufacturer name from the user; and
updating an archive to include the manufacturer designation for the manufacturer name.

6. The computer-implemented method of claim 1, further comprising flagging the asset record when the manufacturer name is missing, when the manufacturer name is unrecognizable, when the manufacturer is not an original equipment manufacturer (OEM), or when the model number is missing, erroneous, incomplete, or ambiguous.

7. The method of claim 1, wherein determining the model designation comprises:
looking up the model hash code to determine whether a model designation corresponding to the model hash code exists.

8. The method of claim 7, wherein the determined manufacturer designation is a standard manufacturer designation stored in a library or table of manufacturer designations, and wherein the determined model designation is a standard model designation stored in a library or table of model designations.

9. A system of managing asset data records, comprising:
a processor;
a memory coupled to the processor, wherein the memory stores a set of instructions configured to cause the processor to:
receive an asset data record;
identify a manufacturer name and a model number from the received asset data record;
generate a manufacturer hash code corresponding to the manufacturer name and a model hash code corresponding to the model number, wherein the operation of generating the manufacturer hash code comprises:
identifying all punctuation, vowels, repeated characters, prefixes, and suffixes in the manufacturer name;
generating a set of characters by removing all the punctuation, vowels, repeated characters, prefixes, and suffixes from the manufacturer name; and
determining the manufacturer hash code for the manufacturer name by hashing the set of characters;
determine a manufacturer designation and a model designation by using the manufacturer hash code and the model hash code, wherein determining the manufacturer designation comprises looking up the generated manufacturer hash code to determine whether a manufacturer designation corresponding to the generated manufacturer hash code exists; and
store the manufacturer designation and the model designation as an asset catalog data entry.

10. The system of claim 9, wherein the operation of identifying prefixes and suffixes comprises providing a set of key words, and searching for each key word of the set of key words in the manufacturer name.

11. The system of claim 9, wherein the set of instructions are further configured to cause the processor to:
provide a library of manufacturer name variations;
determine a set of manufacturer name variations for the manufacturer name; and
determine the manufacturer designation by using the set of manufacturer name variations.

12. The system of claim 9, wherein the set of instructions are further configured to cause the processor to:
provide a library of manufacturer name cross-references;
determine a set of manufacturer name cross-references for the manufacturer name; and
determine the manufacturer designation by using the set of manufacturer name cross-references.

13. The system of claim 9, wherein the set of instructions are further configured to cause the processor to:
provide the asset record to a user upon failing to determine a manufacturer designation or an asset model;
receive the manufacturer designation for the manufacturer name from the user; and
update an archive to include the manufacturer designation for the manufacturer name.

14. The system of claim 9, wherein the set of instructions are further configured to cause the processor to flag the asset record when the manufacturer name is missing, when the manufacturer name is unrecognizable, when the manufacturer is not an original equipment manufacturer (OEM), or when the model number is missing, erroneous, incomplete, or ambiguous.

15. The system of claim 9, wherein determining the model designation comprises:
looking up the model hash code to determine whether a model designation corresponding to the model hash code exists.

16. The system of claim 15, wherein the determined manufacturer designation is a standard manufacturer designation stored in a library or table of manufacturer designations, and wherein the determined model designation is a standard model designation stored in a library or table of model designations.

17. A system of managing asset data records, comprising:
a database configured to receive an asset data record; and
a non-transitory computer readable medium having instructions thereon, that when executed by a processor, causes the system to:
identify a manufacturer name and a model number from the received asset data record;
generate a manufacturer hash code corresponding to the manufacturer name and a model hash code corresponding to the model number, wherein the operation of generating the manufacturer hash code comprises:
identifying all punctuation, vowels, repeated characters, prefixes, and suffixes in the manufacturer name;
generating a set of characters by removing all the punctuation, vowels, repeated characters, prefixes, and suffixes from the manufacturer name; and
determining the manufacturer hash code for the manufacturer name by hashing the set of characters;
determine a manufacturer designation and a model designation by using the manufacturer hash code and the model hash code, wherein determining the manufacturer designation comprises looking up the generated manufacturer hash code to determine whether a manufacturer designation corresponding to the generated manufacturer hash code exists; and
store the manufacturer designation and the model designation as an asset catalog data entry.

18. The system of claim 17, wherein the operation of identifying prefixes and suffixes comprises providing a set of key words, and searching for each key word of the set of key words in the manufacturer name.

19. The system of claim 17, wherein the instructions, when executed by the processor, further cause the system to:
provide a library of manufacturer name variations;
determine a set of manufacturer name variations for the manufacturer name; and
determine the manufacturer designation by using the set of manufacturer name variations.

20. The system of claim 17, wherein the instructions, when executed by the processor, further cause the system to:
provide a library of manufacturer name cross-references;
determine a set of manufacturer name cross-references for the manufacturer name; and
determine the manufacturer designation by using the set of manufacturer name cross-references.

21. The system of claim 17, wherein the instructions, when executed by the processor, further cause the system to:
provide the asset record to a user upon failing to determine a manufacturer designation or an asset model;
receive the manufacturer designation for the manufacturer name from the user; and
update an archive to include the manufacturer designation for the manufacturer name.

22. The system of claim 17, wherein the instructions, when executed by the processor, further cause the system to:
flag the asset record when the manufacturer name is missing, when the manufacturer name is unrecognizable, when the manufacturer is not an original equipment manufacturer (OEM), or when the model number is missing, erroneous, incomplete, or ambiguous.

23. The system of claim 17, wherein determining the model designation comprises:
looking up the model hash code to determine whether a model designation corresponding to the model hash code exists.

* * * * *